(12) United States Patent
Gamsjäger

(10) Patent No.: US 9,450,321 B2
(45) Date of Patent: Sep. 20, 2016

(54) CONTACT DEVICE FOR CONTACTING A CONTACT CONDUCTOR ARRANGEMENT

(71) Applicant: SCHUNK BAHN- UND INDUSTRIETECHNIK GMBH, Bergheim (AT)

(72) Inventor: Tobias Gamsjäger, Salzburg (AT)

(73) Assignee: SCHUNK BAHN- UND INDUSTRIETECHNIK GMBH, Bergheim (AT)

( * ) Notice: Subject to any disclaimer, the term of this patent is extended or adjusted under 35 U.S.C. 154(b) by 0 days.

(21) Appl. No.: 14/768,505

(22) PCT Filed: Feb. 4, 2014

(86) PCT No.: PCT/EP2014/052157
§ 371 (c)(1),
(2) Date: Aug. 18, 2015

(87) PCT Pub. No.: WO2014/127991
PCT Pub. Date: Aug. 28, 2014

(65) Prior Publication Data
US 2015/0380849 A1    Dec. 31, 2015

(30) Foreign Application Priority Data
Feb. 19, 2013  (DE) .......................... 10 2013 202 671

(51) Int. Cl.
*H01R 13/02* (2006.01)
*B60L 5/08* (2006.01)
(Continued)

(52) U.S. Cl.
CPC ................. *H01R 13/02* (2013.01); *B60L 5/08* (2013.01); *B60L 5/36* (2013.01); *B60L 5/19* (2013.01); *B60L 2200/26* (2013.01); *H01R 41/02* (2013.01)

(58) Field of Classification Search
USPC ............. 191/59.1, 10, 45 R, 55, 70; 439/884
See application file for complete search history.

(56) References Cited

U.S. PATENT DOCUMENTS 1,828,949 A    10/1931   Rossman
3,830,990 A *  8/1974   Gray .......................... B60L 5/22
                                                              191/55

(Continued)

FOREIGN PATENT DOCUMENTS

CN    1174389 A    2/1998
CN    1188454 A    7/1998

(Continued)

OTHER PUBLICATIONS

PCT/EP2014/052157 International Search Report May 14, 2014.

*Primary Examiner* — Alexander Gilman
(74) *Attorney, Agent, or Firm* — King & Schickli, PLLC

(57) ABSTRACT

A contact device for contacting a contact conductor arrangement with at least two contact conductors. The device has at least two contact strip arrangements, each with at least one contact strip arranged on a support. The contact strip supports connect via an arrangement of parallel rods, including two parallel connecting rods, such that the contact strip supports each connect to the connecting rods in one of two parallel hinge planes at mutually spaced hinge points on mutually parallel rotational axes and form a parallelogram with the contact strips aligned parallel to each other. At least one connecting rod central axis parallel to the rotational axes is pivotally connected to a base support at a hinge point such that an advancing motion of the base support in the direction of the contact conductor arrangement causes a corresponding advancing motion of the contact strips.

13 Claims, 2 Drawing Sheets

(51) Int. Cl.
  *B60L 5/36* (2006.01)
  *B60L 5/19* (2006.01)
  *H01R 41/02* (2006.01)

(56) References Cited

U.S. PATENT DOCUMENTS

| | | | | |
|---|---|---|---|---|
| 5,732,803 | A * | 3/1998 | Breitbach | B60L 5/30 |
| | | | | 191/55 |
| 6,273,001 | B1 * | 8/2001 | Amigot | B60L 5/19 |
| | | | | 104/117 |
| 6,418,397 | B1 * | 7/2002 | Brand | B60L 5/28 |
| | | | | 191/50 |
| 6,474,455 | B1 * | 11/2002 | Blaschko | B60L 5/19 |
| | | | | 105/199.1 |
| 6,591,953 | B2 * | 7/2003 | Blanvillain | B60L 5/22 |
| | | | | 191/57 |
| 8,499,910 | B2 * | 8/2013 | Hubner | B60L 5/005 |
| | | | | 180/2.1 |
| 9,346,361 | B2 * | 5/2016 | Francke | B60L 5/12 |
| 2011/0106349 | A1 * | 5/2011 | Sakita | B60L 11/1801 |
| | | | | 701/22 |
| 2013/0105264 | A1 * | 5/2013 | Ruth | B60L 5/26 |
| | | | | 191/59.1 |
| 2014/0041951 | A1 * | 2/2014 | Tojima | B60L 5/24 |
| | | | | 180/2.1 |
| 2014/0097054 | A1 * | 4/2014 | Francke | B60L 5/08 |
| | | | | 191/59.1 |
| 2014/0138200 | A1 * | 5/2014 | Dronnik | B60L 5/08 |
| | | | | 191/59.1 |

FOREIGN PATENT DOCUMENTS

| | | |
|---|---|---|
| DE | 845056 C | 7/1952 |
| DE | 3104678 A1 | 1/1982 |
| DE | 10054766 A1 | 5/2002 |
| DE | 102011076620 A1 | 11/2012 |
| DE | 102011076623 A1 | 11/2012 |
| JP | S62126095 A | 6/1987 |

* cited by examiner

Fig. 1
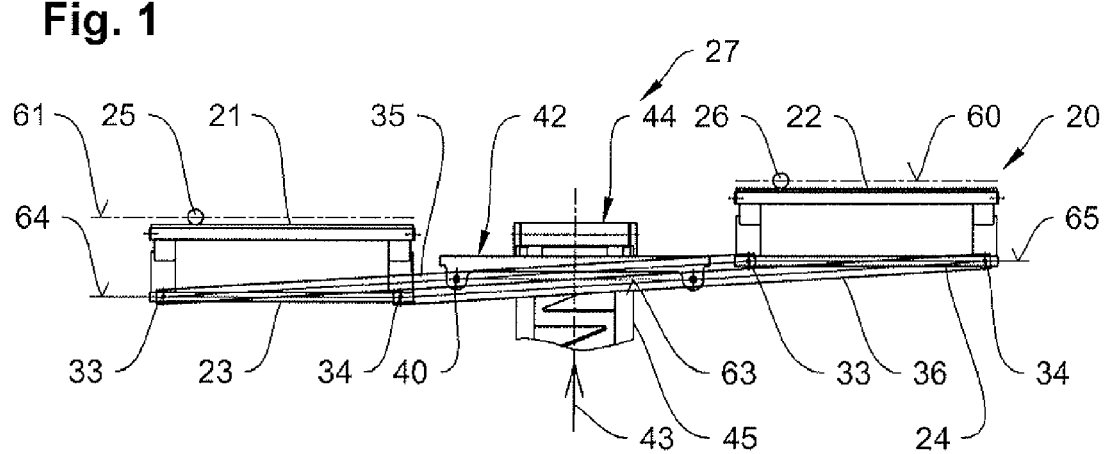
Fig. 2
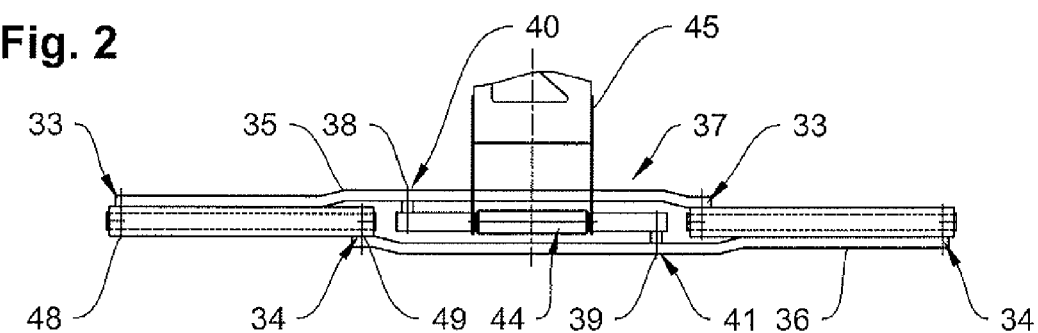
Fig. 3
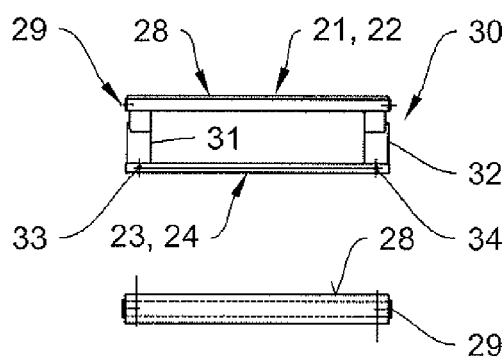
Fig. 4
Fig. 5
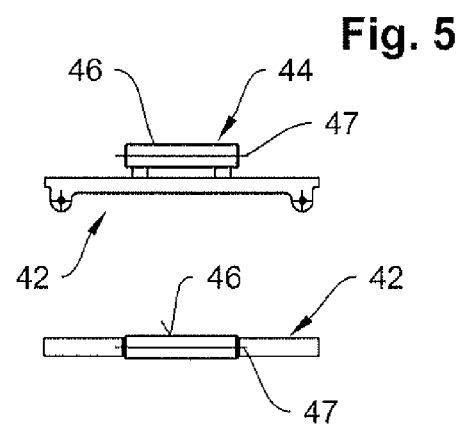
Fig. 6

Fig. 7
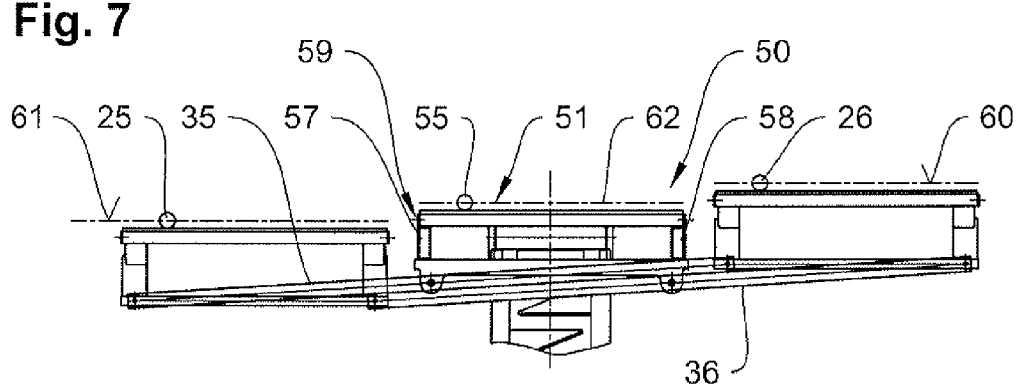
Fig. 8
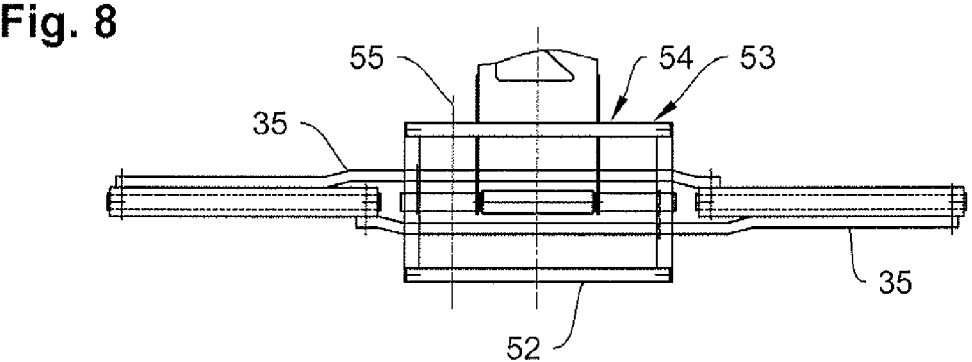
Fig. 9
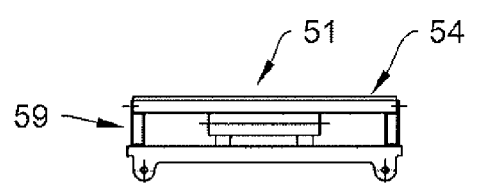
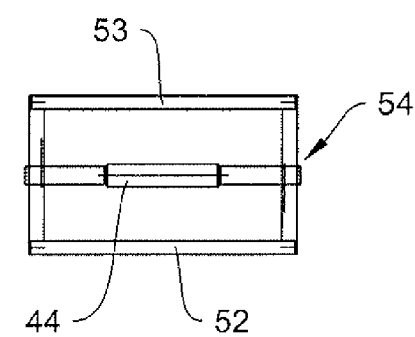
Fig. 10

CONTACT DEVICE FOR CONTACTING A CONTACT CONDUCTOR ARRANGEMENT

FIELD OF THE INVENTION

The present invention relates to a contact device for contacting a contact conductor arrangement comprising at least two contact conductors, the contact device having at least two contact strip arrangements, each comprising at least one contact strip arranged on a contact strip support, the contact strip supports being connected to each other via an arrangement of parallel rods comprising two parallel connecting rods, such that the contact strip supports are each connected to the connecting rods in one of two parallel hinge planes at mutually spaced hinge points on parallel rotational axes and form a parallelogram with the contact strips, which are aligned parallel to each other, at least one connecting rod central axis, which runs parallel to the rotational axes, is connected to a base support at a hinge point in a pivoting manner such that an advancing motion of the base support in the direction of the contact conductor arrangement causes a corresponding advancing motion of the contact strips.

BACKGROUND OF THE INVENTION

Contact devices of the kind mentioned above are usually part of current transmission systems for electrically operated machines that are connected to an external power source. In particular, contact devices of the kind mentioned above can be used for current transmission of electrically operated vehicles, i.e., for example, for transmitting current via an overhead wire system to the electric drive of a rail vehicle. Contact devices of the above-mentioned kind are used for temporary power transmission in particular in hybrid drive systems, in which another power source is available besides the electrical current supply.

The temporary contact of the contact device to a current-supplying contact conductor arrangement needed in particular for temporary power transmission usually requires an advancing device that is connected to the contact device and may be realized as a lifting device, for example, so as to make the contact strips of the contact device touch the contact conductor arrangement and to interrupt the contact again, if necessary, by removing the contact strips from the contact conductor arrangement. The advancing motions carried out for this purpose by the contact strips require more or less elaborate advancing devices, depending on the size and on installation conditions of the required contact devices, said advancing devices often vastly exceeding both the constructional effort and the production costs for the actual contact device.

SUMMARY OF THE INVENTION

The present invention is based on the object of proposing a contact device of the aforementioned kind that is realized in such a manner that the advancing device needed for utilization of the contact device can be designed to be as simple and cost-effective as possible.

Said object is attained by a contact device having the features of claim 1.

In case of the contact device according to the invention, contact strip supports, on which the contact strips provided for contacting the contact conductor arrangement are arranged, are connected to each other via an arrangement of parallel rods comprising two parallel connecting rods, such that the contact strip supports are each connected to the connecting rods in one of two parallel hinge planes at mutually spaced hinge points on parallel rotational axes and form a parallelogram with contact strips that are aligned parallel to each other. At least one connecting rod central axis, which runs parallel to the rotational axes, is connected to a base support at a hinge point in a pivoting manner such that an advancing motion of the base support in the direction of the contact conductor arrangement causes a corresponding advancing motion of the contact strip supports.

Owing to the design of the contact device according to the invention, kinematics become possible that ensure the performance of a contact between two contact strips, which are movably connected to a shared base support via an arrangement of parallel rods, and two mutually independent contact conductors of a contact conductor arrangement in such a manner that the contact strips are made to touch the contact conductors of the contact conductor arrangement with a defined and consistent contact force by only one advancing device that is connected with the base support of the contact device.

In combination with the connecting rods of the arrangement of parallel rods, the contact strips, which are aligned parallel to each other, form a transmission parallelogram, which ensures that a consistent contact force is produced between the contact strips and the contact supports independently of the horizontal and vertical distance between the contact conductors.

The arrangement of parallel rods, which is realized as a hinge parallelogram and by means of which the contact strips arranged on the contact strip supports are connected to the base support, ensures on the one hand that the contact strips are always located in mutually parallel planes and on the other hand that in case a contact strip touches a contact conductor of the contact conductor arrangement via the arrangement of parallel rods, a consistent contact force occurs between the contact strips and the associated contact conductors even if the contact conductors are located in different contact conductor planes.

A particularly stable design of the contact device becomes possible if in a preferred embodiment both connecting rods are connected with their central axes, each of which runs parallel to the rotational axes, to the base support at a hinge point in a pivoting manner.

In another preferred embodiment of the contact device, the contact strips are connected to the contact strip supports via spring devices so that a steady increase of the contact force is made possible when the contact strips are in contact with the contact conductors of the contact conductor arrangement.

If, in addition to the two contact strip supports, the base support is realized as an additional contact strip support comprising a contact strip arrangement, which is connected to the base support via a spring device and comprises at least one contact strip, at least three contact conductors of a contact conductor arrangement can be contacted simultaneously, wherein said three contact conductors may be located in different contact conductor planes.

Preferably, the pivoting connection between the connecting rods and the base support takes place at two mutually spaced hinge points of the base support, said hinge points being located in a hinge plane that is arranged parallel to the hinge planes of the contact strip supports so that the contact strip of the base support, too, is aligned parallel to the extension planes of the contact conductors during the advancing motion.

In particular if the arrangement of the of the contact strip arrangement on the base support is selected in such a manner that the contact strip arrangement of the base support is located above the contact strips of the other contact strip supports, it can be ensured that when using the contact device, contact between the contact strip arrangement of the base support is always made first and contact between the contact strips of the two other contact strip supports is only made afterwards. This may be especially advantageous if, for example, a middle contact conductor of a contact conductor arrangement is realized as a ground conductor and if a safe connection between the contact conductor arrangement and the electrical machine requires that the ground conductor be electrically contacted first.

Preferably, the contact strip arrangement of the base support comprises at least two contact strips, which may be arranged one behind the other or also side by side perpendicularly to the direction of extension of the contact conductor arrangement.

If each contact strip is associated with one spring device, it is possible to make contact with contact conductors that are arranged in different contact conductor planes via the different contact strips of the contact strip arrangement of the base support.

Conventional contact strips may be used if the contact strips are realized, as least in part, as sliding contact strips.

Preferably the contact strips are arranged, at least in part, in a rotatable manner on the contact strip supports so that wear of the contact strips can be reduced. Moreover, it thus is possible for the contact strips to align themselves on the contact conductors so as to provide a contact surface as large as possible.

If the base support is connected to a lifting device to perform an advancing motion, an advancing motion of the contact device can be performed in a particularly simple manner, especially if the lifting device is connected to the base support via a pivot hinge.

BRIEF DESCRIPTION OF THE DRAWING FIGURES

In the following description, preferred embodiments of the contact device will be explained in more detail with the aid of the drawings.

In the figures:

FIG. 1 shows a contact device according to a first embodiment in a front view;

FIG. 2 shows a top view of the contact device illustrated in FIG. 1;

FIG. 3 shows a front view of a contact strip arranged on a contact strip support;

FIG. 4 shows a top view of the contact strip illustrated in FIG. 3;

FIG. 5 shows a top view of a base support of the contact device illustrated in FIG. 1;

FIG. 6 shows a top view of the base support illustrated in FIG. 5;

FIG. 7 shows a front view of another embodiment of a contact device comprising a base support realized as a contact strip support;

FIG. 8 shows a top view of the contact device illustrated in FIG. 7;

FIG. 9 shows a front view of the base support realized as a contact strip support; and FIG. 10 shows the base support in a top view.

DETAILED DESCRIPTION OF THE INVENTION

FIGS. 1 and 2 show a contact device 20 comprising two contact strips 21, 22, each of which is arranged on a contact strip support 23, 24 and serves to contact one contact conductor 25 and 26, respectively, of a contact conductor arrangement 27. The contact strip supports 23, 24 are arranged parallel to a plane of extension 60, 61 of the contact conductors 25, 26.

As can be seen in particular from FIGS. 3 and 4, in the case at hand the contact strips 21, 22 each comprise a contact 28 that is rotatably mounted on a contact axis 29, said contact axis 29 being connected to the contact strip support 23, 24 via a spring device 30 having two spring supports 31, 32, which here are realized as a telescopic device.

In the illustrated embodiment example, the contact strip supports 23, 24 are connected in a pivoting manner to an arrangement of parallel rods 37, which comprises two connecting rods 35, 36, at two mutually spaced hinge points 33, 34, each of which is arranged in one of two parallel hinge planes 64, 65 as illustrated in FIGS. 1 and 2, on two rotational axes 48, 49, which are arranged parallel to the planes of extension 60, 61 of the contact conductors 25, 26, said connection being such that the left hinge point 33 of the contact strip supports 23, 24 and the right hinge joint 34 of the contact strip supports 23, 24 are connected to each other via a first connecting rod 35 and via the second connecting rod 36, respectively. Furthermore, central aces 38, 39 of the connecting rods 35 and 36, respectively, which run perpendicularly to the longitudinal extension of the connecting rods 35, 36, are connected, at hinge points 40, 41 in a pivoting manner, to a base support 42 arranged parallel to the contact strip supports 23, 24, the hinge points 40, 41 being located in a hinge plane that is parallel to the planes of extension 60, 61 of the contact conductors 25, 26. Thus, an advancing motion 43 in the direction of the contact conductor arrangement 27 causes a corresponding advancing motion of the contact strip supports 23, 24 which are connected to the base support 42 via the arrangement of parallel rods 37.

To perform an advancing motion 43 of this kind, the base support is connected, in a pivoting manner via a pivot hinge 44, to a pivot arm 45 of a lifting device (not illustrated), which may be arranged on the roof of a rail vehicle in the manner of a pantograph, for example.

As shown in particular in FIGS. 5 and 6, in the case at hand the pivot hinge device 44 comprises a hinge sleeve 46, which is provided for connection to the pivot arm 45 and is arranged on a pivot axis 47, which is connected to the base support 42.

In FIGS. 7 to 10, another embodiment of a contact device 50 is illustrated, which has all the components of the contact device 20 described before with reference to FIGS. 1 to 9 and, in contrast to contact device 20, has a base support 51 that is realized as a contact strip support comprising, in the case of the presently illustrated embodiment example, a contact strip arrangement 54 having two contact strips 52, 53, said contact strips 52, 53 being arranged one behind the other in the direction of another contact strip 55, which is arranged above the base support 51 in a plane of extension 62. Said contact strips 52, 53 are realized in correspondence to the afore-described contact strips 21, 22 and are connected to the base support 51 via a spring device 59 comprising two spring supports 57, 58.

The invention claimed is:

1. A contact device (20, 50) for contacting a contact conductor arrangement (27) comprising at least two contact conductors (25, 26), the contact device having at least two contact strip arrangements, each comprising at least one contact strip (21, 22) arranged on a contact strip support (23, 24), the contact strip supports being connected to each other via an arrangement of parallel rods (37) comprising two parallel connecting rods (35, 36), such that the contact strip supports are each connected to the connecting rods in one of two parallel hinge planes (64, 65) at mutually spaced hinge points (33, 34) on mutually parallel rotational axes (48, 49) and form a parallelogram with the contact strips, which are aligned parallel to each other, at least one connecting rod central axis (38, 39), which runs parallel to the rotational axes, being connected to a base support (42, 51) at a hinge point (40, 41) in a pivoting manner such that an advancing motion (43) of the base support in the direction of the contact conductor arrangement causes a corresponding advancing motion of the contact strips.

2. The contact device according to claim 1, characterized in that
both connecting rods (35, 36) are connected with their central axes (38, 39), each running parallel to the rotational axes (48, 49), to the base support (42) at a hinge point (40, 41) in a pivoting manner.

3. The contact device according to claim 1, characterized in that
the contact strips (21, 22) are connected to the contact strip supports (23, 24) via spring devices (30).

4. The contact device according to claim 1, characterized in that
the base support (51) is realized as an additional contact strip support, which comprises a contact strip arrangement (54), which is connected to the base support via a spring device (59) and comprises at least one contact strip (52, 53).

5. The contact device according to claim 1, characterized in that
the pivoting connection between the connecting rods (35, 36) and the base support (42, 51) is realized at two mutually spaced hinge points (40, 41) of the base support, which are located in a hinge plane (63) arranged parallel to the hinge planes (64, 65) of the contact strip supports.

6. The contact device according to claim 4, characterized in that
the contact strip arrangement (54) comprises at least two contact strips (52, 53).

7. The contact device according to claim 4, characterized in that
the contact strip arrangement (54) comprises a plurality of contact strips (52, 53) that are arranged one behind the other in the direction of extension of the contact conductor arrangement (27).

8. The contact device according to claim 4, characterized in that
the contact strip arrangement comprises a plurality of contact strips that are arranged side by side perpendicularly to the direction of extension of the contact conductor arrangement.

9. The contact device according to claim 4, characterized in that
each contact strip (52, 53) is associated with one spring device.

10. The contact device according to claim 1, characterized in that
at least in part, the contact strips are realized as sliding contact strips.

11. The contact device according to claim 1, characterized in that
at least in part, the contact strips (21, 22, 52, 53) are arranged on the contact strip supports (23, 24) in a rotatable manner.

12. The contact device according to claim 1, characterized in that
the base support (42, 51) is connected to a lifting device to perform an advancing motion (43).

13. The contact device according to claim 12, characterized in that
the lifting device is connected to the base support (42, 51) via a pivot hinge (44).

* * * * *